(12) United States Patent
Drews (10) Patent No.: US 8,593,005 B2
(45) Date of Patent: Nov. 26, 2013

(54) WATER WHEEL FOR GENERATING POWER

(76) Inventor: Hartmuth Drews, Pinneberg (DE)

(*) Notice: Subject to any disclaimer, the term of this patent is extended or adjusted under 35 U.S.C. 154(b) by 15 days.

(21) Appl. No.: 13/512,939

(22) PCT Filed: Jan. 5, 2011

(86) PCT No.: PCT/DE2011/000010
§ 371 (c)(1),
(2), (4) Date: Jun. 20, 2012

(87) PCT Pub. No.: WO2011/082705
PCT Pub. Date: Jul. 14, 2011

(65) Prior Publication Data
US 2012/0262036 A1 Oct. 18, 2012

(30) Foreign Application Priority Data
Jan. 8, 2010 (DE) .................... 10 2010 004 157

(51) Int. Cl.
*F03B 13/10* (2006.01)

(52) U.S. Cl.
USPC .............................................. 290/43; 290/54

(58) Field of Classification Search
USPC ...................................................... 290/43, 54
See application file for complete search history.

(56) References Cited

U.S. PATENT DOCUMENTS

| | | | |
|---|---|---|---|
| 4,045,148 A | | 8/1977 | Morin |
| 4,104,536 A | * | 8/1978 | Gutsfeld ........................ 290/54 |
| 5,495,128 A | * | 2/1996 | Brammeier ..................... 290/54 |
| 2011/0042957 A1 | | 2/2011 | Drews |

FOREIGN PATENT DOCUMENTS

| | | |
|---|---|---|
| DE | 102 791 | 9/1898 |
| DE | 102 18 443 | 11/2003 |
| FR | 2 320 430 | 3/1977 |
| GB | 2 190 144 | 11/1987 |

OTHER PUBLICATIONS

PCT International Search Report of the International Searching Authority for International Application PCT/DE2011/000010, mailed Nov. 24, 2011, 2 pages, European Patent Office, HV Rijswijk, Netherlands.
PCT International Preliminary Report on Patentability including English Translation of PCT Written Opinion of the International Searching Authority for International Application PCT/DE2011/000010, issued Jul. 10, 2012, 6 pages, International Bureau of WIPO, Geneva, Switzerland.

* cited by examiner

*Primary Examiner* — Tho D Ta
(74) *Attorney, Agent, or Firm* — W. F. Fasse (57) ABSTRACT

It is provided to embody as a modularly constructed system, a water wheel for power generation via generators with transversely extending water blades as hinged or folding blades. In this regard it is provided to arrange the water blades over a truss framework. The truss framework for each water blade is formed by a transversely extending prism-like arrangement of plural connected struts as transverse supports, whereby these are connected at node points by longitudinal rods, and at least one strut of the transverse supports is connected with the wheel rim. In that regard, a longitudinal rod located at the top and arranged over the transverse supports is embodied for the rotatable support of a pivotably received water blade via a mounting receiver and a longitudinal rod is allocated as a counter support for the water blade in its working position. Simultaneously this longitudinal rod serves for limiting a pivoting motion of the neighboring water blade in the turbulent region.

8 Claims, 10 Drawing Sheets

WATER WHEEL FOR GENERATING POWER

The invention relates to a water wheel for generating power by allocated generators with water paddles, blades or vanes that are arranged in a ring shape and extend transversely, and that can be impinged upon by streaming or free-falling supplied water, and the water blades are arranged between constructed wheel rims as outer boundaries, as well as being respectively connected via spokes with an axle stub for bearing support, whereby the individual water blades are formed of structurally identical elements embodied to be stiff against bending and on their outer sides are allocated to the lateral wheel rims of the water wheel.

Water wheels with water blades arranged ring-shaped are known in many different embodiments. In this regard it has been shown in practice, that a lightweight construction and a modular system with a high degree of pre-fabrication has a considerable importance.

With known water wheels it has been shown, that the efficiency is sharply reduced by rigidly arranged water blades. Safety concerns also exist, if a relatively closed or solid surface is formed by the water blades, because thereby a damming surface is formed upon any arising breakdowns or faults in operation.

Additionally, the wind catching surface is relatively large, so that an impairment arises with corresponding wind conditions.

It is the object of the invention to produce a water wheel of the above generic type with a lightweight construction and with automatic or self-acting pivotable blades, which makes possible a modular system with a high degree of pre-fabrication, and is lacking wind sensitivity without forming air inclusions, and ensures an energetically optimized arrangement of water blades with a large submersion depth.

The solution to this object is achieved according to the invention in that the water blades are arranged over a truss framework and the truss framework is formed as a transversely extending prism-like arrangement of plural connected struts as transverse supports, which are connected by longitudinal rods at node points, and at least one strut of the transverse supports is connected with the wheel rim, whereby a longitudinal rod arranged over the transverse supports is embodied for the rotatable support of a pivotably received water blade via mounting receivers, and a longitudinal rod is allocated as a counter support for the water blade in a working position as well as on the other hand for limiting a pivoting motion of the neighboring water blade in the position in the turbulent region or downstream flow shadow.

Thereby a modular lightweight construction is made possible in a simple manner, whereby the pivotably suspended and supported water blades, even with a large submersion depth, emerge perpendicularly out of the water in an optimized manner in the turbulent region or flow shadow and thereby increase the efficiency in a simple manner.

Furthermore, with the same submersion depth of the water blades, the structural size of the water wheel diameter is significantly smaller than those of waterwheels with rigidly arranged blading, and thus leads to a savings of material, so that an advantageous mass-power relationship is achieved.

As head water or drive water flows into the water wheel, advantageously an escape of the air through the truss framework into the interior of the wheel is made possible, and an orderly impingement of the water blades by the head water or drive water is carried out, without air volumes being entrapped. Furthermore, in this manner also excess water can be automatically directed away for relieving the load of the entire construction. Hereby an advantageous effect is achieved on the static dimensioning of all individual components of the water wheel.

An advantageous embodiment of the truss framework exists in that the struts for the transverse supports are embodied as a triangle arrangement and the allocated water blade is supported in the end region via an upper connected longitudinal rod.

An alternative embodiment is formed in that the struts for the transverse supports are arranged as a square or rectangular arrangement and the allocated water blade is supported in the central surface area, whereby an additional longitudinal rod is formed as a counter support by support arms outside of the transverse support.

In order to adjust the rotational motion of the water blades in the individual positions as folding blades and to obtain a controlled motion, it is suggested that the inwardly lying area of the water blade comprises extensions for receiving adjustment weights.

Alternatively it is suggested that the water blade with a support in the central surface area comprises adjustment weights in the inwardly lying area of the water blade at a spacing distance from the pivot axis.

A further alternative influencing of a rotating motion of the water blade exists in that the bearing support areas of the water blade on the longitudinal rod comprise through mounting receivers with adjustable adjustment elements for restraining or arresting pivoting motions of the water blade.

For forming an economical modular system it is suggested that the wheel rim with its spokes is formed of combinable and assemblable sector elements for receiving an axle stub.

Further it is suggested, that for forming a generator the wheel rim as a rotor carries in the form of permanent magnets, and a corresponding partial ring as a stator via electrical coils is arranged in the area of a support structure for receiving an axle stub.

Example embodiments of the invention are schematically illustrated in the drawings. It is shown by.

An illustrated water wheel 1 consists of outer side wheel rims 2, which are formed via spokes 3 with an axle stub or shaft stub 4, and are rotatably arranged by the shaft stubs 4 over a foundation or a support console or bracket as a support structure, which is not illustrated in further detail.

Individual water blades, paddles or vanes 5 of movable elements that are embodied to be stiff against bending are arranged between the wheel rims 2, and are received via a truss framework 6. On its outer boundaries, the truss framework 6 is rigidly connected with the wheel rims 2 and thereby forms a light support structure for the water blades 5 for forming the water wheel 1.

The truss framework 6 is formed by a prism-shaped arrangement, wherein several struts 7 are connected via node points 9 and form transverse supports 8.

Figure 1:
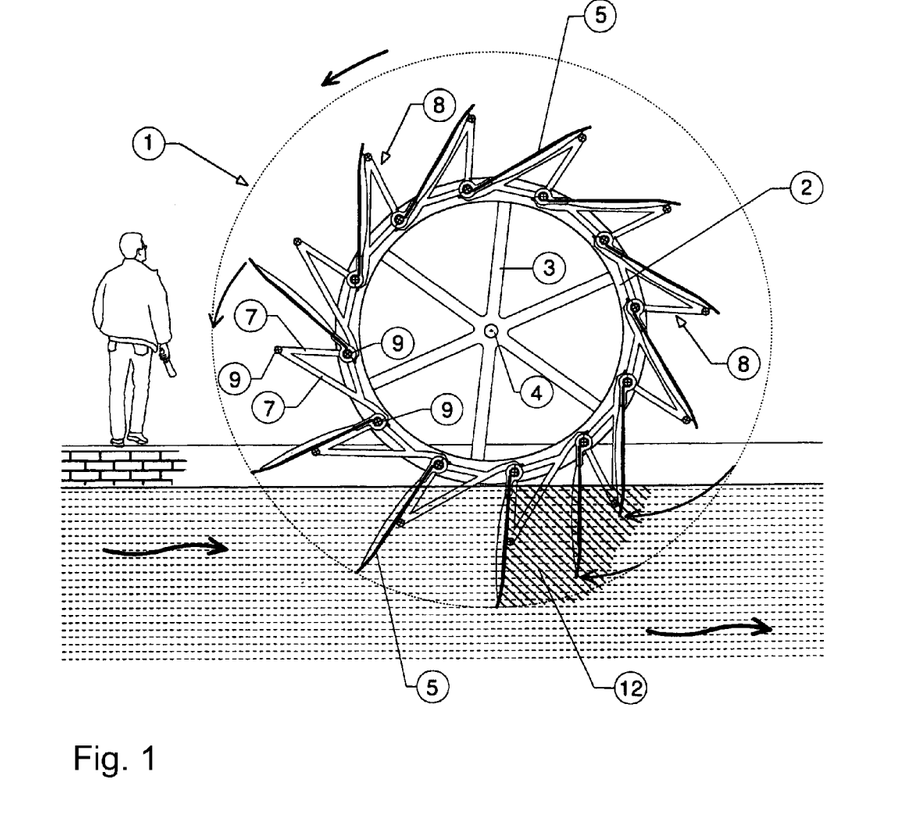
FIG. 1 a basic principle or diagrammatic illustration of a water wheel with pivotable blades in a side view.
Figure 2:
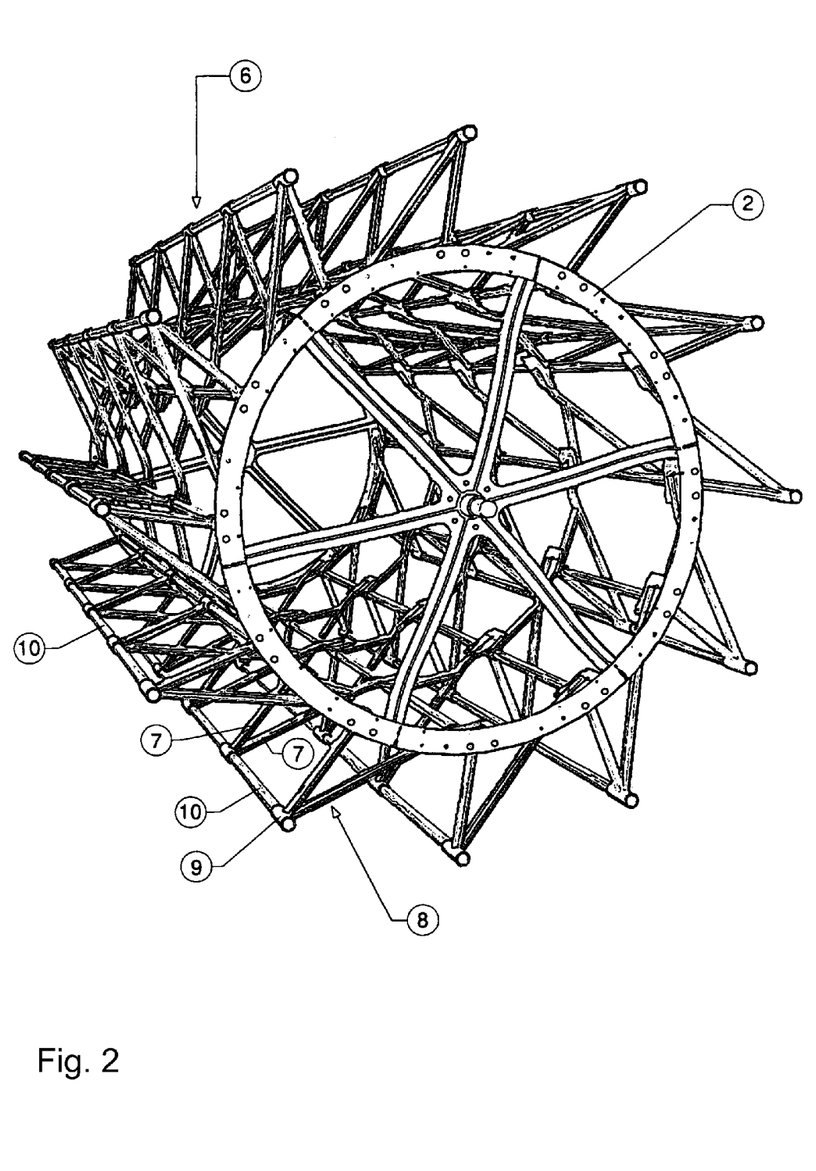
FIG. 2 a perspective illustration of an embodiment of the water wheel without water blades with a pivoting connection for the water blades via a truss framework as a prism construction with transverse supports in a triangle arrangement.
Figure 3:
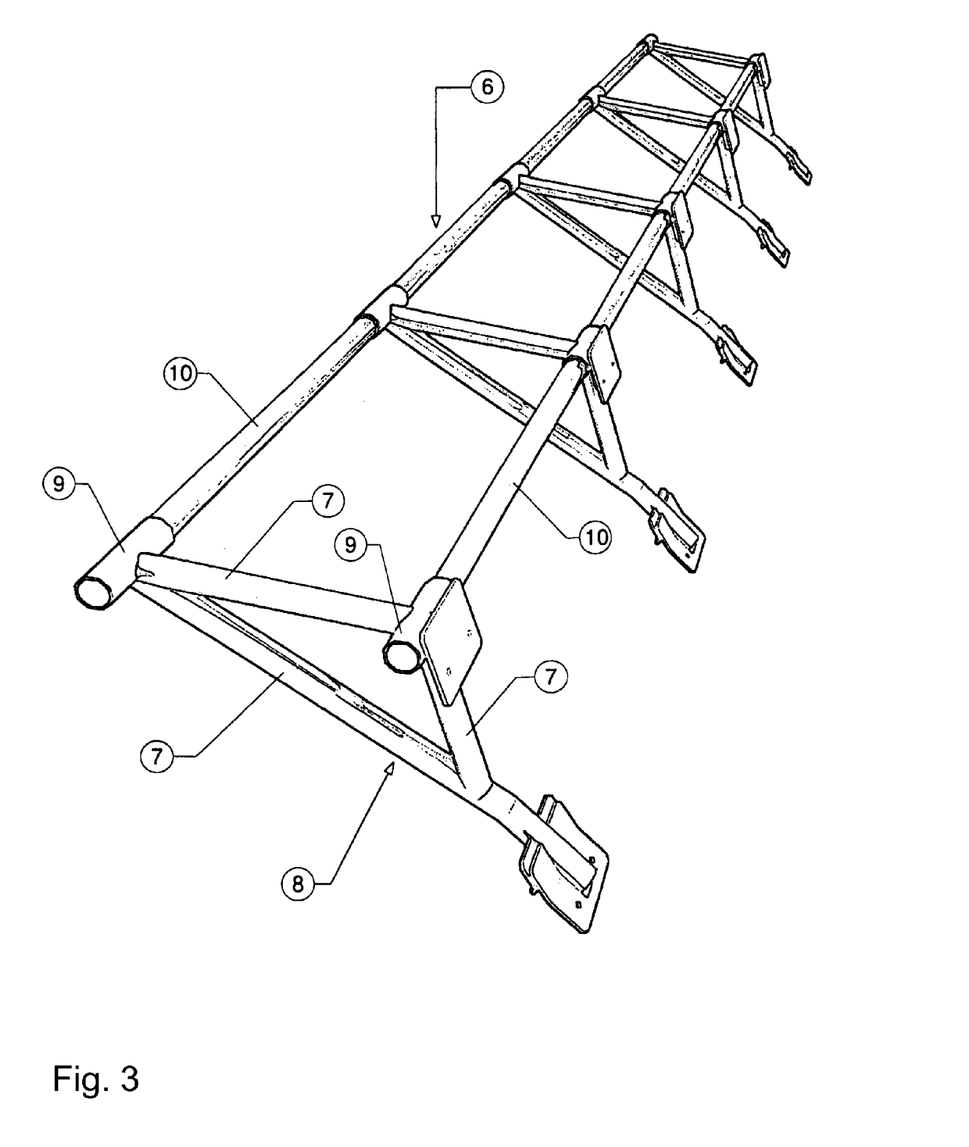
FIG. 3 an enlarged illustration of the arrangement for receiving the water blades with transverse supports in a triangle arrangement according to FIG. 2.
Figure 4:
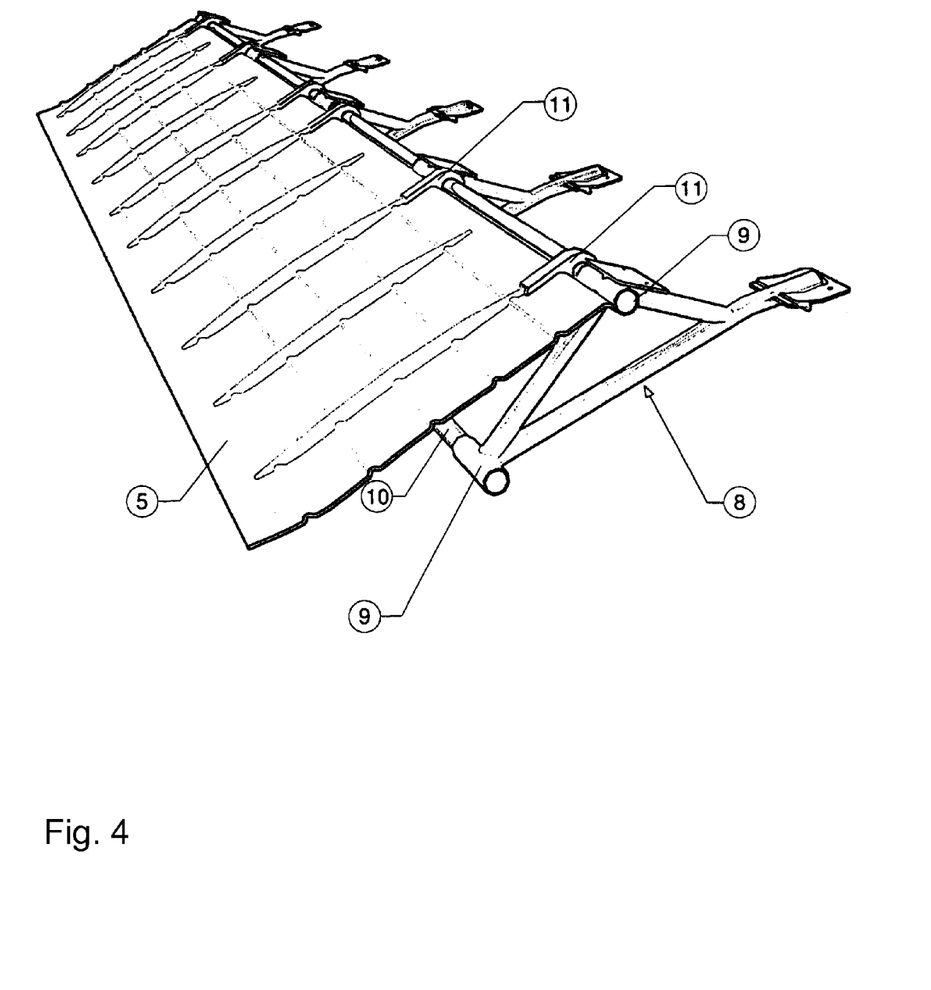
FIG. 4 an illustration like FIG. 3 with connected water blades.
Figure 5:
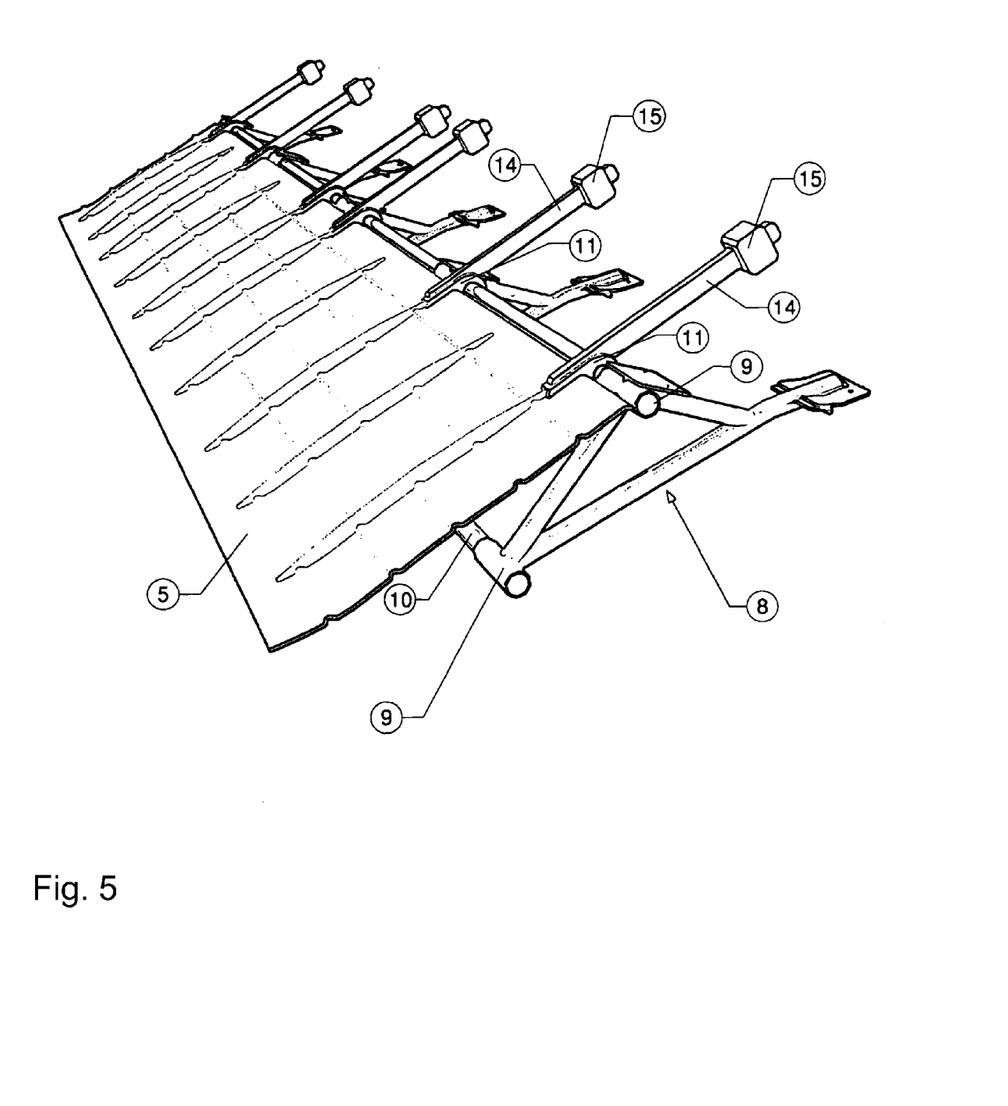
FIG. 5 an embodiment of the arranged water blades with an extension for receiving adjustment weights.
Figure 6:
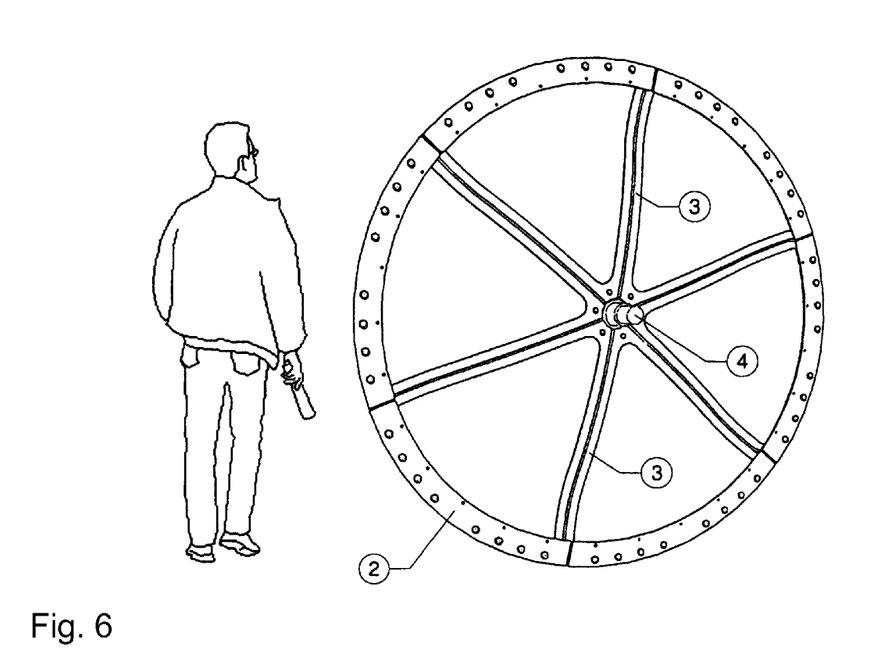
FIG. 6 a side view onto a wheel rim as an outer boundary with spokes and receiving an axle stub of individual segments, FIG. 7 an exploded view according to FIG. 6.
Figure 7:
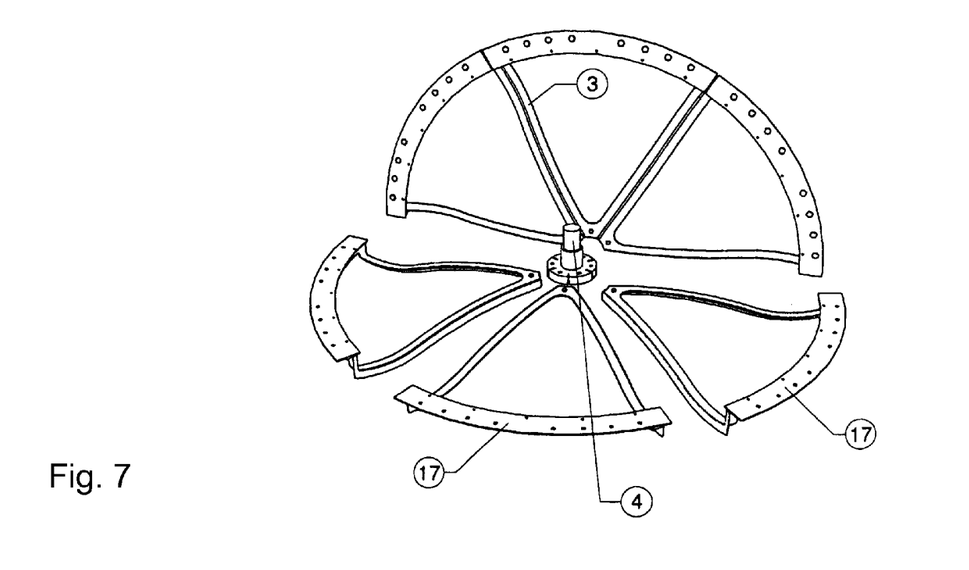
Figure 8:
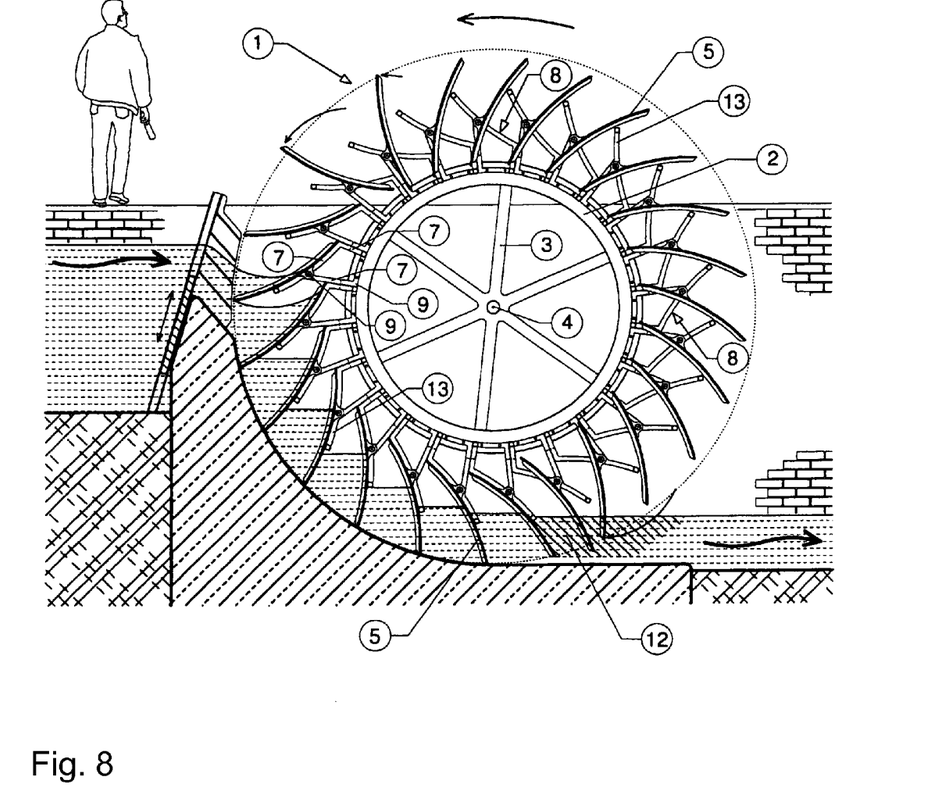
FIG. 8 a further embodiment of the water wheel in a basic principle or diagrammatic illustration with a mounting receiver of the prism construction with transverse supports in a square or rectangular arrangement.
Figure 9:
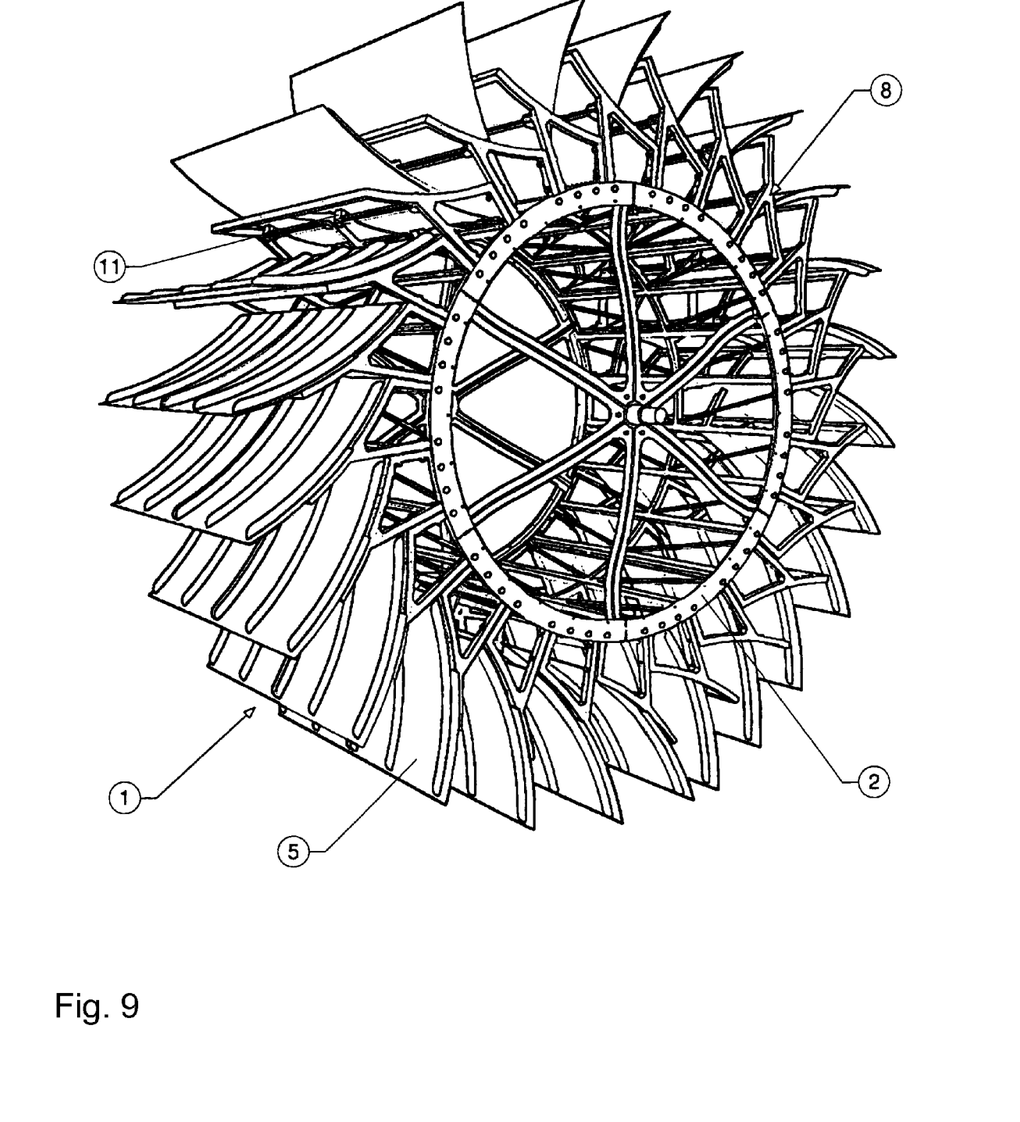
FIG. 9 a perspective illustration according to FIG. 8.
Figure 10:
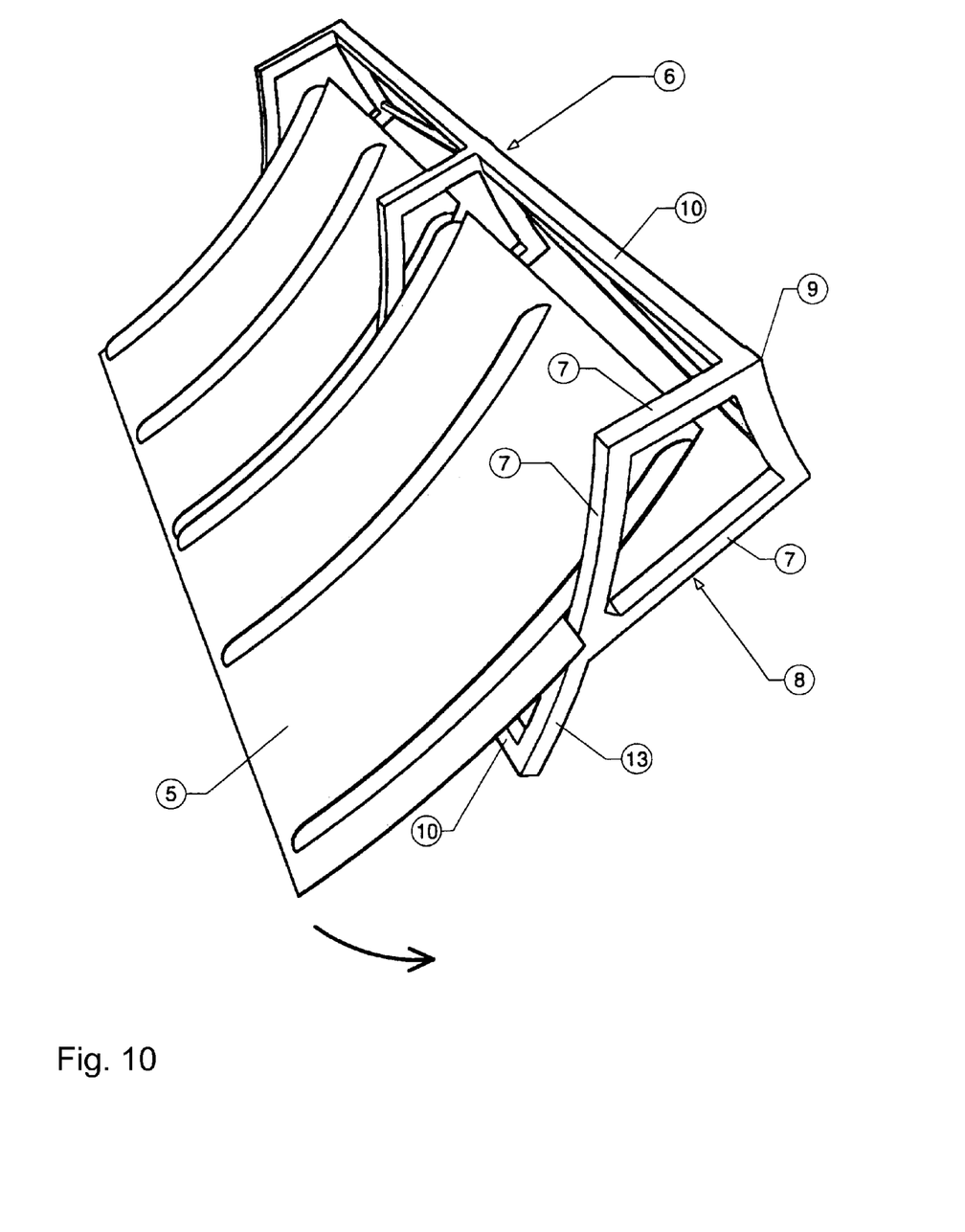
FIG. 10 an illustration of a square or rectangular arrangement as transverse support with received water blade.
Figure 11:
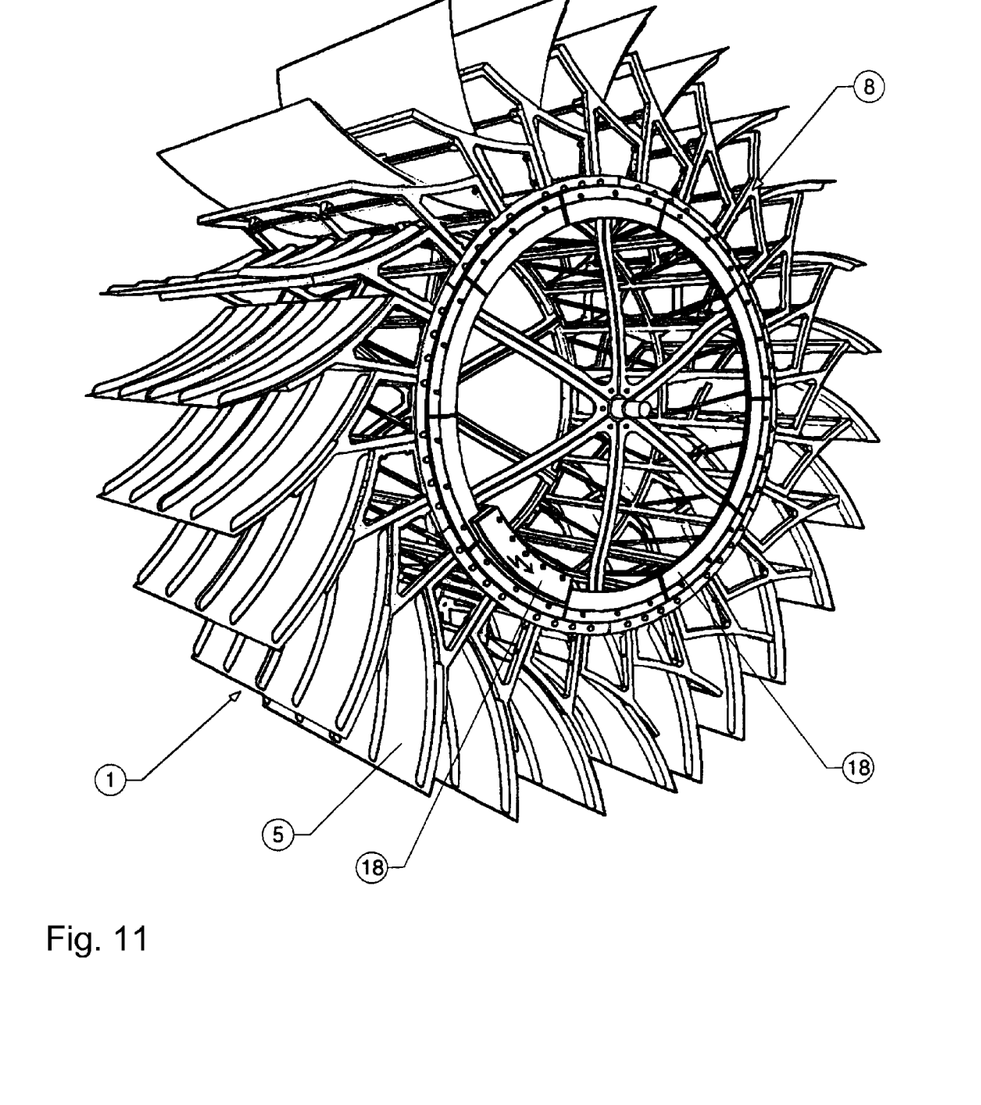
FIG. 11 an illustration like FIG. 9 with an integrated generator.

The transverse supports 8 are embodied as a triangle arrangement in the illustration according to FIGS. 2 to 5 and as a square or rectangle arrangement in FIGS. 8 to 10. The formed transverse supports 8 are connected in the formed node points 9 by longitudinal rods 10, whereby a strut 7 or a holding element set onto the longitudinal rods 10 in the end area is rigidly connected with the wheel rim 2 and thus forms a stable support structure.

Each water blade 5 is held by mounting receivers 11 in an automatically or self-acting pivotable manner via a longitudinal rod 10 that is held by the transverse supports 8. In this regard, one longitudinal rod 10 serves for the embodiment as a counter support for the pivotable water blade 5 in its working position.

On the other hand, the longitudinal rod 10 as a counter support is simultaneously utilized for limiting a pivoting motion of the neighboring water blade 5, which is located in the turbulent region or flow shadow 12 of the rotating motion of the water wheel 1.

By this arrangement of pivotable water blades 5 it is thus possible that the water blades 5 arranged in the turbulent region or flow shadow 12 reduce the resistance in a rotating motion and are retracted or pulled-out quasi-perpendicularly during the rotating motion.

In an arrangement according to FIGS. 8 to 10 with a square or rectangular arrangement of the transverse support 8, the water blade 5 is pivotably supported in the central surface area via mounting receivers 11, whereby via an additional longitudinal rod 12 via support arms 13 outside of the transverse support 8 as a counter support in the working position and in the position in the turbulent region or flow shadow 12 is formed.

The water blades 5 are pivotably arranged by the mounting receivers 11 in the form of bushings on the longitudinal rod 12. In order to allow the pivoting motion to proceed in a controlled manner, it is provided that the mounting receivers 11 as bushings comprise adjustable adjustment elements. Hereby a hard impacting onto bounding or limiting longitudinal rods 12 is avoided.

An alternative embodiment for influencing a pivoting motion is achieved in that, in the inwardly lying area, the water blade 5 comprises extensions 14 for receiving adjustable adjustment weights 15. With regard to the bearing support arranged in the central surface area of the water blade 5, hereby an arrangement of adjustment weights 15 is provided in the inwardly lying area at a spacing distance from the pivot axis, which adjustment weights can also be embodied as a thickened bead on the water blade 5.

In order to improve a modular construction, the wheel rim 2 with its spokes 3 are built or constructed from sector elements 17 for the formation of individual modules.

For forming an integrated generator the wheel rim 2 is equipped with permanent magnets 18 as a rotor, and in the area of the support structure for receiving the axle stub 4 a corresponding partial ring 19 as a stator is arranged through or by electric coils and in principle is allocated thereto.

The invention claimed is:

1. Water wheel for generating power by allocated generators with ring-shaped arranged and transversely extending water blades, which are impingable upon by streaming or free-falling supplied water, and the water blades are arranged between formed wheel rims as outer boundaries, as well as respectively connected via spokes with an axle stub for the bearing support, whereby the individual water blades are formed of structurally identical elements that are embodied to be stiff against bending and are allocated at their outer sides to the lateral wheel rims of the water wheel, characterized in that the water blades (5) are arranged over a truss framework (6) and the truss framework (6) is formed as a transversely extending prism-like arrangement of plural connected struts (7) as transverse supports (8), which are connected at node points (9) by longitudinal rods (10) and at least one strut (7) of the transverse supports (8) is connected with the wheel rim (2), whereby a longitudinal rod (10) arranged over the transverse supports (8) is embodied for the rotational support of a pivotably received water blade (5) via mounting receivers, and a longitudinal rod (10) is allocated as a counter support for the water blade (2) in a working position as well as on the other hand for limiting a pivoting motion of the neighboring water blade (2) in the position in the turbulent region (18).

2. Water wheel according to claim 1, characterized in that the struts (7) for the transverse supports (8) are embodied as a triangle arrangement and the allocated water blade (2) in the end area is supported via an upper connected longitudinal rod (12).

3. Water wheel according to claim 1, characterized in that the struts for the transverse supports (8) are arranged as a square or rectangle arrangement and the allocated water blade (5) is supported in the central surface area, whereby an additional longitudinal rod (12) is formed as a counter support via support arms outside of the transverse support.

4. Water wheel according to claim 1, characterized in that the inwardly lying area of the water blade (5) comprises extensions (14) for receiving adjustment weights (15).

5. Water wheel according to claim 1, characterized in that the water blade (5) with a bearing support in the central surface area comprises adjustment weights (16) in the inwardly lying area of the water blade (5) at a spacing distance from the pivot axis.

6. Water wheel according to claim 1, characterized in that the bearing support areas of the water blade (5) on the longitudinal rod comprise through mounting receivers (11) with adjustable adjustment elements for restraining or arresting pivoting motions of the water blade (5).

7. Water wheel according to claim 1, characterized in that the wheel rim (2) with its spokes (3) is formed of combinable and assemblable sector elements (17) for receiving an axle stub (4).

8. Water wheel according to claim 1, characterized in that for forming a generator the wheel rim (2) as a rotor carries in the form of permanent magnets (18), and a corresponding partial ring (19) as a stator via electrical coils is arranged in the area of a support structure for receiving an axle stub (4).

* * * * *